United States Patent
Michelini et al.

(10) Patent No.: US 7,464,674 B2
(45) Date of Patent: Dec. 16, 2008

(54) INDUCTION AIR ACOUSTICS MANAGEMENT FOR INTERNAL COMBUSTION ENGINE

(75) Inventors: John Michelini, Sterling Heights, MI (US); Ilya Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/424,780

(22) Filed: Jun. 16, 2006

(65) Prior Publication Data
US 2008/0066699 A1   Mar. 20, 2008

(51) Int. Cl.
  *F01L 9/04* (2006.01)
  *F02D 41/10* (2006.01)
(52) U.S. Cl. .................... 123/90.11; 123/339.26
(58) Field of Classification Search .......... 123/90.11, 123/90.15–90.17, 337, 198 F, 481, 339.1, 123/339.25, 339.26
See application file for complete search history.

(56) References Cited

U.S. PATENT DOCUMENTS

| | | | |
|---|---|---|---|
| 5,571,239 A | 11/1996 | Kameda et al. | |
| 5,850,458 A | 12/1998 | Tomisawa et al. | |
| 6,263,857 B1 | 7/2001 | Obata et al. | |
| 6,427,661 B1 * | 8/2002 | Spannbauer | 123/337 |
| 6,755,182 B1 | 6/2004 | Kolmanovsky et al. | |
| 7,104,243 B2 * | 9/2006 | Winstead | 123/90.11 |
| 2007/0056560 A1 * | 3/2007 | Trask et al. | 123/90.15 |

FOREIGN PATENT DOCUMENTS

JP   2001159328   * 6/2001

* cited by examiner

*Primary Examiner*—Stephen K Cronin
*Assistant Examiner*—Arnold Castro
(74) *Attorney, Agent, or Firm*—Allan Lippa; Brooks Kushman P.C.

(57) ABSTRACT

A system and method for controlling an internal combustion engine control an actuator in response to variations of intake airflow relative to an average intake airflow to manage induction acoustics. The system and method may include controlling an actuator, such as a throttle valve, to increase intake manifold vacuum in response to intake airflow. In an engine having electronically actuated intake and/or exhaust valves, intake airflow is estimated based on at least engine speed and valve timing and compared to a measured intake airflow to determine a first difference. The measured airflow is divided into a steady-state and transient term or component with a second difference determined based on the transient component and a target value. Throttle valve position is selectively controlled to increase vacuum in response to a combination of the first and second difference to manage induction acoustics.

20 Claims, 2 Drawing Sheets

INDUCTION AIR ACOUSTICS MANAGEMENT FOR INTERNAL COMBUSTION ENGINE

BACKGROUND

1. Technical Field

Systems and methods for controlling an internal combustion engine to manage induction air acoustics.

2. Background Art

Customer expectations for engine/vehicle sounds generally vary based on the type of vehicle and relative engine/vehicle output, with louder sounds expected or tolerated at higher engine outputs. Internal combustion engine valve train technologies developed to improve fuel economy, such as electromagnetic valve actuation (EVA), can control airflow by changing valve timing and opening the electronic throttle valve to reduce pumping losses and increase engine efficiency. However, this often increases sound levels associated with induction air that may exceed some customer's expectations under various operating conditions and may therefore be undesirable. One known strategy used to manage acoustics associated with induction air includes closing the electronic throttle in response to a manifold pressure (MAP) sensor to create a manifold vacuum. However, this solution depends on the particular throttle body flow characteristics and provides acceptable results at moderate manifold vacuums, but is difficult to control at lower manifold vacuums and low to moderate engine speeds, particularly in variable displacement engines that may operate on fewer than all of the cylinders with active cylinders operating at full load. For example, when operating in a lower displacement mode with 4 or 6 active cylinders of an 8 cylinder engine, the total engine output is an average of the active and inactive cylinders although each running cylinder operates at full load (low manifold vacuum) to maximize efficiency and fuel economy benefits. Under these conditions controlling the throttle to a target manifold pressure using feedback and/or feed-forward control based on manifold pressure does not provide acceptable acoustic control because small throttle valve angle changes can increase induction sound levels without a corresponding increase in manifold pressure.

SUMMARY

A system and method for managing induction acoustics of an internal combustion engine control at least one actuator to increase manifold pressure in response to estimated induction acoustics.

The present disclosure includes embodiments having electronically controlled intake and/or exhaust valves and a controller that estimates induction acoustics based on estimated or calculated intake airflow determined using engine speed, valve timing, and a measured airflow provided by a corresponding sensor. The measured airflow may be divided into steady-state (or DC) and transient (or AC) components or terms, with the transient term indicative of airflow pulsations associated that affect induction acoustics. The transient component is compared to a corresponding target to generate a difference, which is used together with a difference between the estimated/calculated and measured airflow to modify throttle valve position of an electronically controlled throttle valve.

Those of ordinary skill in the art will recognize a number of advantages associated with the present disclosure. For example, a more robust control that estimates induction acoustics based on an intake airflow sensor and manages acoustics by appropriate positioning of the throttle valve or other actuator to selectively increase intake vacuum and reduce intake noise under various engine/vehicle operating conditions is provided. Furthermore, induction acoustics management is provided using existing sensors and actuators rather than relying on additional acoustic or vibration sensors.

The above advantages and other advantages and features will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, multi-cylinder port injected internal combustion engine operable in a variable displacement mode with electromagnetically actuated intake and/or exhaust valves and an electronically controlled throttle valve. Those of ordinary skill in the art may recognize similar applications or implementations with other engine/vehicle technologies including direct injected and/or port injected engines, and engines having one or more throttle valves or other airflow and/or vacuum (or pressure) control devices, for example.

Figure 1:
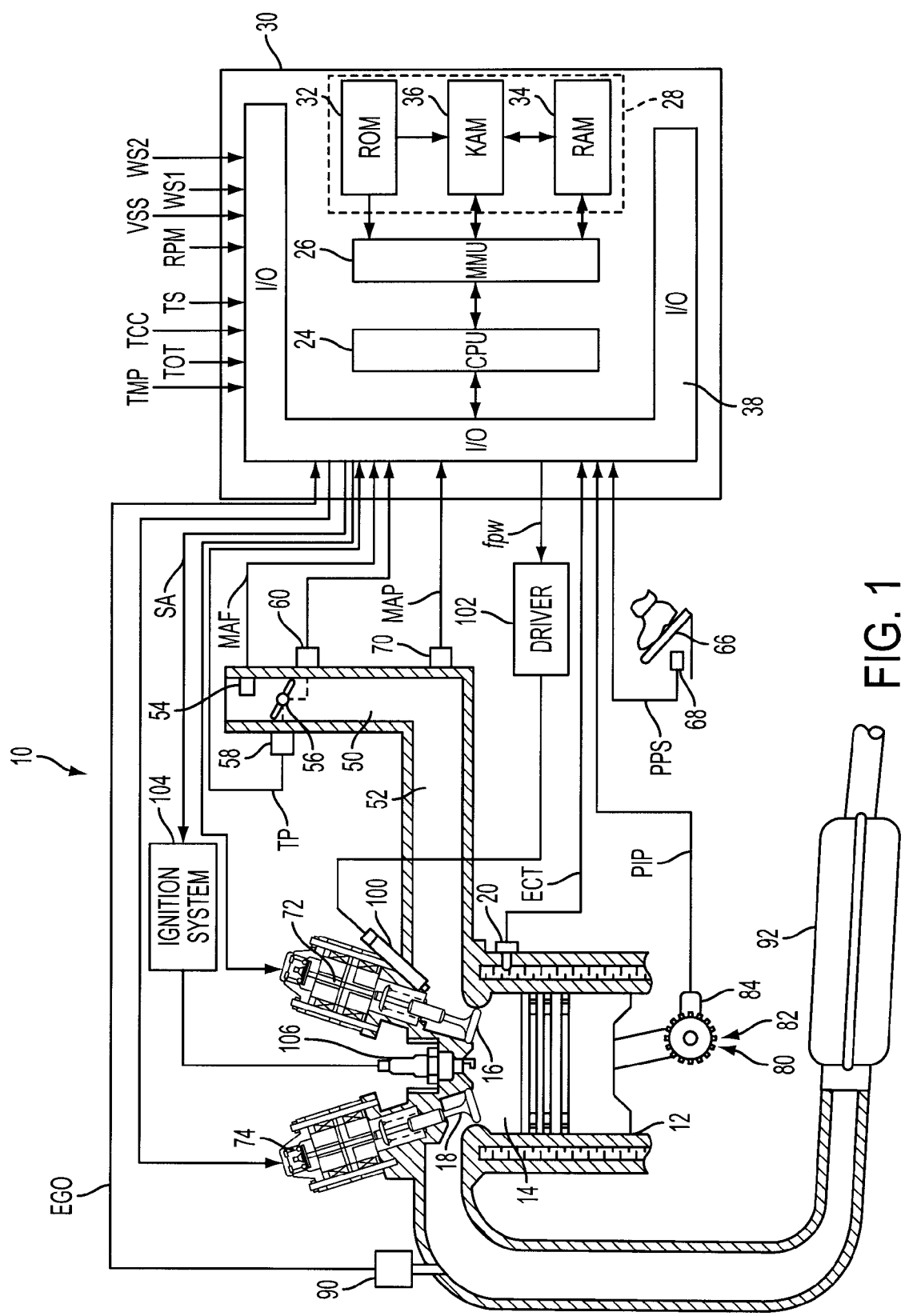
FIG. 1 is a block diagram illustrating operation of a representative engine/vehicle application with induction acoustics management.

In the representative embodiment illustrated in FIG. 1, system 10 includes a vehicle (not specifically illustrated) powered by an internal combustion engine having a plurality of cylinders, represented by cylinder 12, with corresponding combustion chambers 14. As one of ordinary skill in the art will appreciate, system 10 includes various sensors and actuators to effect control of the engine/vehicle. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. However, the engine may include only a single engine coolant temperature sensor 20. In the embodiment illustrated in FIG. 1, the engine includes electromagnetically or electronically actuated intake valves 16 and exhaust valves 18 in communication with a microprocessor-based controller 30 to control valve opening and closing times to achieve a desired vehicle deceleration as described in greater detail below. In another embodiment, intake valves 16 are electronically actuated and exhaust valves 18 are conventionally actuated by an associated camshaft (not shown). In one embodiment, system 10 may be operated in a variable displacement mode with fewer than all cylinders 12 participating in combustion by deactivating corresponding actuators, such as fuel injector 100, spark plug 106 and/or valves 16, 18. Operation in a variable or reduced displacement mode is generally associated with higher manifold pressure and wider opening of throttle valve 56 to reduce pumping losses and increase efficiency of the activated or operating cylinders. However, absent features of the present disclosure, this may lead to objectionable intake air or induction acoustics. Accordingly, disclosed embodiments manage induction acoustics based on current operating conditions with appropriate positioning of throttle valve 56 or other airflow actuator(s) as described in greater detail herein.

Controller 30 has a microprocessor 24, also referred to as a central processing unit (CPU), in communication with memory management unit (MMU) 26. MMU 26 controls the movement of data among the various computer readable storage media 28 and communicates data to and from CPU 24. Computer readable storage media 28 preferably include volatile and nonvolatile storage in read-only memory (ROM) 32, random-access memory (RAM) 34, and keep-alive memory (KAM) 36, for example. KAM 36 may be used to store various operating variables while CPU 24 is powered down. Computer-readable storage media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media 28 may also include floppy disks, CD-ROMs, hard disks, and the like.

CPU 24 communicates with various engine/vehicle sensors and actuators via an input/output (I/O) interface 38. Interface 38 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be directly or indirectly actuated under control of CPU 24, through I/O interface 38, are fuel injection timing, rate, and duration, throttle valve position, spark plug ignition timing (for spark-ignition engines), intake/exhaust valve timing and duration, front-end accessory drive (FEAD) components such as an alternator, air conditioning pressure, and the like. Sensors communicating input through I/O interface 38 may be used to indicate crankshaft position (PIP), engine rotational speed (RPM), wheel speed (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio (PRN), transmission oil temperature (TOT), transmission turbine speed (TS), torque converter clutch status (TCC), deceleration or shift mode (MDE), for example.

Some controller architectures do not contain an MMU 26. If no MMU 26 is employed, CPU 24 manages data and connects directly to ROM 32, RAM 34, and KAM 36. Of course, more than one CPU 24 may be used to provide engine control and controller 30 may contain multiple ROM 32, RAM 34, and KAM 36 coupled to MMU 26 or CPU 30 depending upon the particular application.

In operation, inducted air passes through intake 50 and is distributed to the plurality of cylinders via an intake manifold, indicated generally by reference numeral 52. System 10 preferably includes a mass airflow sensor 54, or other airflow sensor, that provides a corresponding signal (MAF) to controller 30 indicative of the intake or induction airflow. A throttle valve 56 or other airflow control device may be used to modulate the airflow and control manifold pressure in intake 50 to control engine torque to a desired output torque while managing induction acoustics. Throttle valve 56 is preferably electronically controlled by an appropriate actuator 58 based on a corresponding throttle position (TP) signal generated by controller 30. The throttle position (TP) signal may be generated to position the throttle in response to a corresponding engine output or torque requested by an operator via accelerator pedal 66 while providing induction acoustics management based on current operating conditions including intake airflow, manifold pressure, and engine speed, for example. A throttle position sensor 60 provides a feedback signal to controller 30 indicative of the actual position of throttle valve 56 to implement closed loop control of throttle valve 56.

A manifold absolute pressure sensor 70 is used to provide a signal (MAP) indicative of the manifold pressure to controller 30. Air passing through intake manifold 52 enters combustion chamber 14 through appropriate control of one or more intake valves 16. Intake valves 16 and/or exhaust valves 18 may be controlled using electromagnetic actuators 72, 74, a conventional camshaft arrangement, a variable camshaft timing arrangement, or a combination thereof depending on the particular application and implementation. In one embodiment, intake valves 72 are constant lift valves that are electromagnetically operated by controller 30 to control intake valve timing including opening, closing, and duration with exhaust valves 18 being operated by a conventional cam or variable cam device. Intake and/or exhaust valve timing and duration may be controlled in combination with throttle valve position to modulate engine torque and provide induction acoustics management.

Rotational position information for controlling the engine may be provided by a crankshaft position sensor 80 that includes a toothed wheel 82 and an associated sensor 84. Crankshaft position sensor 80 may be used to generate a signal (PIP) used by controller 30 for fuel injection and ignition timing. In one embodiment, a dedicated integrated circuit chip (EDIS) within controller 30 is used to condition/process the raw rotational position signal generated by position sensor 80 and outputs a signal (PIP) once per cylinder per combustion cycle, i.e. for a four-cylinder engine, four PIP signals per combustion cycle are generated for use by the control logic. Crankshaft position sensor 80 may also be used to determine engine rotational speed and to identify cylinder combustion based on an absolute, relative, or differential engine rotation speed.

An exhaust gas oxygen sensor 90 provides a signal (EGO) to controller 30 indicative of whether the exhaust gasses are lean or rich of stoichiometry. Depending upon the particular application, sensor 90 may provide a two-state signal corresponding to a rich or lean condition, or alternatively a signal that is proportional to the stoichiometry of the exhaust gases. This signal may be used to adjust the air/fuel ratio, or control the operating mode of one or more cylinders, for example. The exhaust gas is passed through the exhaust manifold and one or more catalysts 92 before being exhausted to atmosphere.

A fuel injector 100 injects an appropriate quantity of fuel in one or more injection events for the current operating mode based on a signal (FPW) generated by controller 30 and processed by driver 102. At the appropriate time during the combustion cycle, controller 30 generates a spark signal (SA)

that is processed by ignition system 104 to control spark plug 106 and initiate combustion within chamber 14.

Controller 30 includes software and/or hardware implementing control logic to control the engine to manage induction acoustics. As described in greater detail with reference to FIG. 2, controller 30 may estimate induction acoustics based on intake airflow as measured by intake airflow sensor 54. Under high cylinder load conditions, particularly when operating in a reduced or variable displacement mode at low to moderate engine speeds, pressure pulsations that create induction noise influence the MAF signal provided by sensor 54. In severe cases, referred to as backflow, the pressure or airflow pulsations can interfere with the airflow measurement provided by sensor 54 because the sensor can not distinguish flow direction such that large pulsations across airflow sensor 54 overshadow the smaller bulk air flow into the engine. As such, controller 30 calculates/estimates intake airflow based at least on engine speed and valve timing of intake valves 16 and/or exhaust valves 18. The calculated/estimated intake airflow is not affected by flow direction or pulsations within intake manifold 52. As such, the difference between the measured airflow based on the MAF signal from sensor 54 and the estimated/calculated intake airflow may be used to provide an indication of induction acoustics, with a larger difference indicative of more induction noise. Various other current operating conditions/parameters may also be used in determining the estimated intake airflow and/or estimated induction noise, such as intake air temperature, barometric pressure, engine speed, operating mode, etc. Throttle valve 56 may then be controlled in response to the estimated/calculated induction acoustics to increase vacuum (lower relative pressure) in intake manifold 52 to reduce sound generated by intake airflow. Of course, various other engine operating parameters may also be adjusted to provide a desired engine output while managing induction acoustics. For example, controller 30 may control intake valves 16, exhaust valves 18, throttle valve 56, timing of spark plug 106 and/or fuel timing/metering via fuel injector 100 to adjust the net engine output power or torque taking into account any additional load of front-end accessory drive (FEAD) components to actively managing induction acoustics while achieving a desired engine output.

Figure 2:
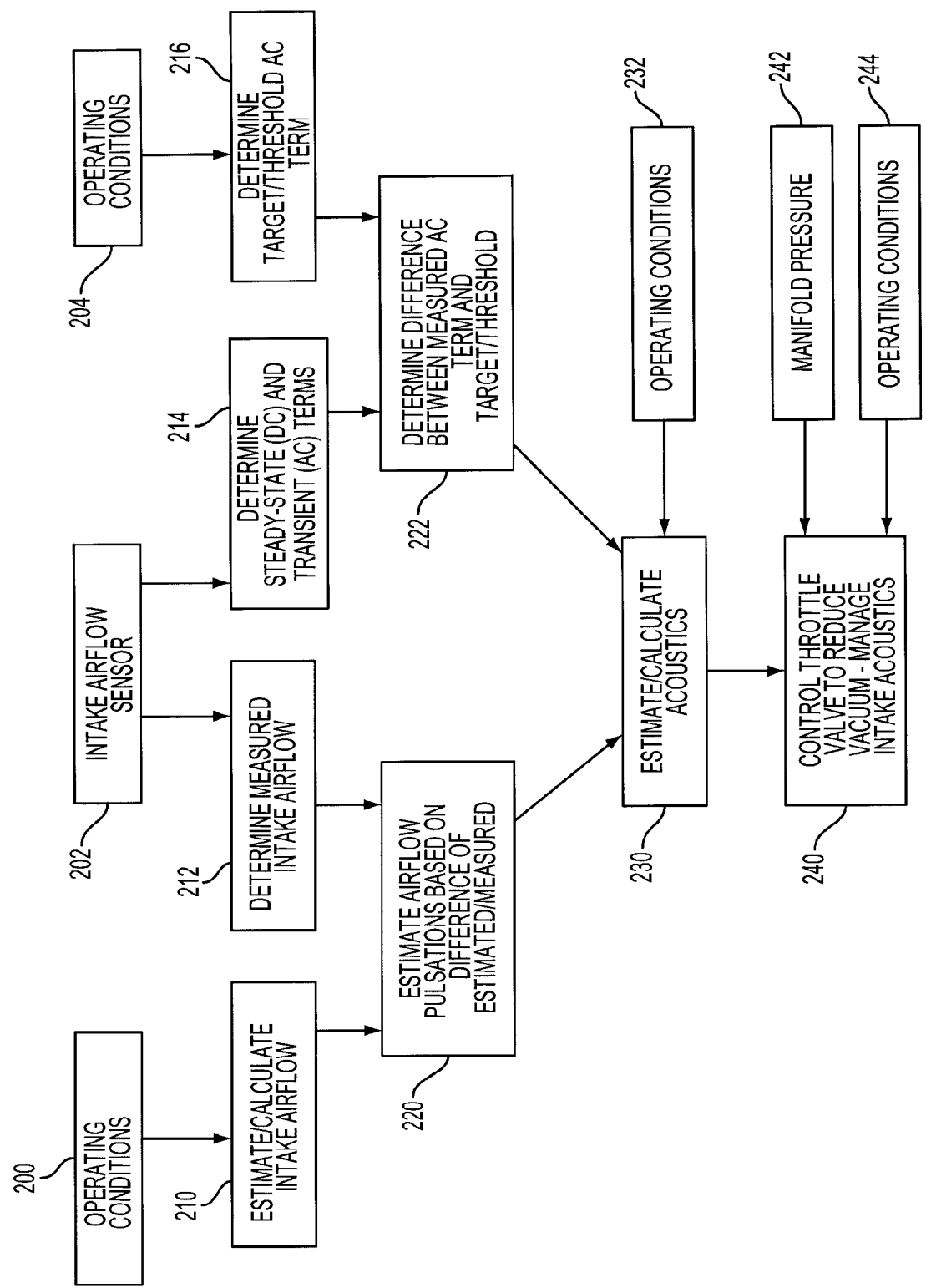
FIG. 2 is a flow chart illustrating operation of a system or method for managing induction acoustics.

A diagram illustrating operation of a system and method for controlling an internal combustion engine to manage induction acoustics is shown in FIG. 2. The diagram of FIG. 2 provides representative control strategies for an internal combustion engine having electronically actuated intake valves. As will be appreciated by one of ordinary skill in the art, an induction air acoustics control strategy may also be applied or adapted for use with various other engine technologies as previously described. The control strategies and/or logic illustrated in FIG. 2 represents any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. Preferably, the control logic is implemented primarily in software executed by a microprocessor-based vehicle, engine, and/or powertrain controller, such as controller 30 (FIG. 1). Of course, the control logic may be implemented in software, hardware, or a combination of software and hardware in one or more controllers depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, and/or optical storage to keep executable instructions and associated calibration information, operating variables, and the like.

Block 200 of FIG. 2 represents determination of current operating conditions, which may include current operating mode(s) (idle, cruise, start, shutdown, reduced displacement, etc.) in addition to engine, vehicle, and/or ambient conditions or parameters (temperature(s), pressure(s), speed(s), accessory(ies) state of operation, etc.). Similarly, blocks 204, 232, and 244 determine current engine, vehicle and/or ambient operating conditions or modes although the particular operating conditions or modes selected for use in each instance may vary. For example, block 200 may provide intake air temperature, barometric pressure, engine speed, engine displacement mode (or number of active cylinders) and valve timing for use by block 210 to estimate/calculate intake airflow, whereas block 204 may provide engine speed, accelerator pedal position, and idle mode status to block 216 to determine a target or threshold value for the transient (AC) term of the measured intake airflow.

An intake airflow sensor provides a signal indicative of current inducted airflow as represented by block 202, which is used to determine a measured intake airflow as represented by block 212. For example, a mass airflow (MAF) sensor or similar device may be used to provide a signal indicative of measured airflow. As described above, under high cylinder load conditions the accuracy of the measured airflow determination may be adversely impacted by pulsating airflow because the sensor does not detect the direction of the airflow. As such, the determination by block 212 may not be indicative of actual inducted airflow. The airflow pulsations contribute to undesirable induction acoustics that are managed as described herein. An estimate of the inducted airflow pulsations is provided at block 220 by comparing the intake airflow determined by block 212 to an estimated or calculated intake airflow determined by block 210. The estimated or calculated intake airflow may be determined based on the cylinder displacement, engine speed, air temperature, manifold pressure, and engine valve timing, for example. The estimated or calculated intake airflow is not affected by pulsations or changes in direction of the intake airflow. As such, the difference between the estimated and measured intake airflow may be used to provide an indication of the amplitude of induction air pulsations as represented by block 220.

The intake airflow sensor signal 202 is also used to determine a steady-state (or DC) term or component and a transient (AC or dynamic) term or component as represented by block 214. The sensor signal or corresponding values may be separated into AC and DC components using an appropriate filter implemented by hardware and/or software. The AC term of the measured intake airflow is compared to a corresponding threshold or target term determined by block 216 based on operating conditions 204 as represented by block 222. The difference between the AC term of the measured intake airflow and a target or threshold term based on current operating conditions is used in combination with the estimated airflow pulsations from block 220 and current operating conditions 232 to estimate/calculate induction airflow acoustics at block 230. The throttle valve and/or other actuator(s) are controlled to reduce intake manifold pressure to manage induction acoustics in response to the estimated acoustics as represented by block 240. Throttle valve position is also influenced by the measured manifold pressure 242, which may be determined in response to a corresponding pressure sensor signal (MAP) and current operating conditions 244 to provide the desired engine output. Various other engine actuators such as spark timing, valve timing and/or duration, and fuel metering/timing may also be controlled to provide the desired response while managing the induction acoustics, e.g. when the throttle valve position is modified to manage induction acoustics, the intake and/or exhaust valve timing and/or duration is modified accordingly to maintain the desired torque produced by the engine.

As such, a robust control strategy is provided to manage induction acoustics of an internal combustion engine using conventionally available engine sensors and actuators in response to estimated induction noise based on intake airflow pulsations.

While the best mode has been described in detail, those familiar with the art will recognize various alternative designs and embodiments within the scope of the following claims.

What is claimed:

1. A method for controlling an internal combustion engine to manage induction acoustics, the method comprising:
   closing the throttle in response to variation of an inducted engine air amount relative to an average inducted engine air amount when the variation exceeds a corresponding threshold to manage induction acoustics.

2. The method of claim 1 further comprising controlling at least one engine actuator to increase intake manifold vacuum in response to estimated induction acoustics.

3. The method of claim 1 wherein the internal combustion engine includes a plurality of electronically controlled intake and/or exhaust valves and wherein the inducted engine air amounts are estimated based on at least valve timing and engine speed.

4. The method of claim 1 wherein the internal combustion engine includes an intake airflow sensor, the method further comprising:
   comparing an estimated inducted engine airflow to measured intake airflow.

5. The method of claim 4 further comprising:
   dividing airflow measurements from the airflow sensor into steady-state and transient components; and
   comparing amplitude of the transient components to a predetermined threshold corresponding to current operating conditions.

6. A method for controlling an internal combustion engine operable in a variable displacement mode with less than all cylinders being active to manage induction acoustics, the method comprising:
   increasing the number of active cylinders to reduce sound associated with induction airflow.

7. A method for controlling an internal combustion engine having electronically actuated intake and/or exhaust valves to manage induction acoustics, the method comprising:
   closing the throttle in response to variation of an inducted engine air amount relative to an average inducted engine air amount when the variation exceeds a corresponding threshold; and
   modifying valve timing to modify inducted engine airflow based on estimated induction acoustics.

8. A system for managing induction acoustics of an internal combustion engine, the system comprising:
   an intake airflow sensor;
   a plurality of electronically actuated intake valves;
   an electronically controlled throttle valve; and
   a controller in communication with the intake airflow sensor, the plurality of electronically actuated intake valves, and the electronically controlled throttle valve, the controller controlling the throttle valve to increase manifold vacuum in response to at least the intake airflow sensor to manage induction acoustics.

9. The system of claim 8 wherein the controller closes the throttle valve in response to an inducted engine air amount that varies about an average inducted engine air amount.

10. The system of claim 9 wherein the controller positions the throttle valve in response to estimated induction acoustics based on estimated airflow determined using at least engine speed and valve timing, and measured airflow based on the intake airflow sensor.

11. The system of claim 10 wherein the controller controls the throttle valve in response to a difference between the estimated and measured induction airflow.

12. The system of claim 11 wherein the controller separates measured airflow into a steady-state component and a transient component and controls the throttle valve in response to at least the transient component of the measured airflow.

13. The system of claim 12 wherein the controller controls the throttle valve in response to a difference between the transient component and a target value based on current operating conditions, and a difference between measured and estimated induction airflow.

14. The system of claim 11 further comprising a manifold pressure sensor in communication with the controller, wherein the controller further controls the throttle valve in response to manifold pressure.

15. The system of claim 11 wherein the controller deactivates at least one cylinder when operating the engine in a variable displacement mode.

16. A computer readable storage medium having stored data representing instructions executable by a computer to control an internal combustion engine to manage induction acoustics, the computer readable storage medium comprising:
   instructions for controlling at least one engine actuator in response to variation of an inducted engine air amount relative to an average inducted engine air amount when the variation exceeds a corresponding threshold to manage induction acoustics.

17. The computer readable storage medium of claim 16 wherein the instructions for controlling at least one engine actuator include instructions for closing a throttle valve in response to the variation of the inducted engine air exceeding a corresponding threshold.

18. The computer readable storage medium of claim 17 further comprising instructions for determining a difference between an estimated intake airflow based on at least engine speed and valve timing to an airflow measured by an intake airflow sensor and controlling a throttle valve in response to the difference.

19. The computer readable storage medium of claim 18 wherein the instructions for controlling the throttle valve reduce throttle valve opening when the difference exceeds a corresponding threshold.

20. The computer readable storage medium of claim 19 further comprising instructions for determining a steady-state component and a transient component of a measured airflow, determining a difference between the transient component and a target value, and controlling a throttle valve in response to the difference.

* * * * *